US007471851B2

(12) United States Patent
Strelow

(10) Patent No.: US 7,471,851 B2
(45) Date of Patent: Dec. 30, 2008

(54) METHOD AND APPARATUS FOR PROPAGATING HIGH RESOLUTION DETAIL BETWEEN MULTIMODAL DATA SETS

(75) Inventor: Dennis W. Strelow, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 477 days.

(21) Appl. No.: 11/271,367

(22) Filed: Nov. 10, 2005

(65) Prior Publication Data
US 2007/0104393 A1 May 10, 2007

(51) Int. Cl.
G06K 9/32 (2006.01)
G06K 9/40 (2006.01)
(52) U.S. Cl. .................. 382/299; 382/254; 382/274
(58) Field of Classification Search .......... 382/299, 382/100, 128, 155, 156, 159, 224, 225, 254, 382/266, 284; 702/76, 189, 194, 196
See application file for complete search history.

(56) References Cited

U.S. PATENT DOCUMENTS 7,200,243 B2 *  4/2007  Keenan et al. .............. 382/100

OTHER PUBLICATIONS

"Statistical Inference and Synthesis in the Image Domain for Mobile Robot Environment Modeling" L.A. Torres-Mendez and G. Dudek Center for Intelligent Machines, McGill University. Montreal, Canada 8 pages; 2004.

"Statistics in the Image Domain for Mobile Robot Environment Modeling" L.A. Torres-Mendez and G. Dudek Center for Intelligent Machines, McGill University, Montreal, Canada pp. 699-706; Aug. 2004.

"Inter-Image Statistics for Scene Reconstruction" L.A. Torres-Mendez, G. Dudek and P. Di Marco Center for Intelligent Machines, McGill University, Montreal, Canada pp. 432-439; 2004.

"Reconstruction of 3D Models from Intensity Images and Partial Depth" L.A. Torres-Mendez and G. Dudek Center for Intelligent Machines, McGill University, Montreal, Canada pp. 476-481; 2004.

(Continued)

Primary Examiner—Yon Couso
(74) Attorney, Agent, or Firm—Kris T. Fredrick

(57) ABSTRACT

The dataset describing an entity in a first modality and of a first, high resolution is used to enhance the resolution of a dataset describing the same entity in a second modality of a lower resolution. The two data sets of different modalities are spatially registered to each other. From this information, a joint histogram of the values in the two datasets is computed to provide a raw analysis of how the intensities in the first dataset correspond to intensities in the second dataset. This is converted into a joint probability of possible intensities for the missing pixels in the low resolution dataset as a function of the intensities of the corresponding pixels in the high-resolution dataset to provide a very rough estimate of the intensities of the missing pixels in the low resolution dataset. Then, an objective function is defined over the set of possible new values that gives preference to datasets consistent with (1) the joint probability distributions, (2) the existing values in the low resolution dataset, and (3) smoothness throughout the data set. Finally, an annealing or similar iterative method is used to minimize the objective function and find an optimal solution over the entire dataset.

40 Claims, 3 Drawing Sheets

OTHER PUBLICATIONS

"Range Synthesis for 3D Environment Modeling" L.A. Torres-Mendez and G. Dudek Center for Intelligent Machines, McGill University, Montreal, Canada 8 pages; 2003.

"A Statistical Learning Method for Mobile Robot Environment Modeling" L.A. Torres-Mendez and G. Dudek Center for Intelligent Machines, McGill University, Montreal, Canada pp. 85-92; 2003.

"Range Synthesis for 3D Environment Modeling" L.A. Torres-Mendez and G. Dudek Center for Intelligent Machines, McGill University, Montreal, Canada 6 pages; 2002.

"Automated Enhancement of 3D Models" L.A. Torres-Mendez and G. Dudek Center for Intelligent Machines, McGill University, Montreal, Canada 6 pages; The Eurographics Association 2002.

"Super-Resolved Surface Reconstruction From Multiple Images" Technical Report FIA-94-12 P. Cheeseman et al. pp. 1-14; Dec. 14, 1994.

"Super-Resolved Texture Tracking of Planar Surface Patches" F. Dellaert et al. Computer Science Department and The Robotics Institute Carnegie Mellon University, Pittsburgh, PA 7 pages; 1998.

"Filling Holes in Complex Surfaces using Volumetric Diffusion" J. Davis et al. Computer Science Department, Stanford University 11 pages; 2002.

"Stochastic Relaxation, Gibbs Distributions, and the Bayesian Restoration of Images" S. Geman and D. Geman IEEE Transactions on Pattern Analysis and Machine Intelligence, vol. PAMI-6, No. 6, Nov. 1984.

"Filters, Random Fields and Maximum Entropy (FRAME): Towards a Unified Theory for Texture Modeling" S. Zhu et al. International Journal of Computer Vision 27(2), pp. 107-126 (1998).

"Stochastic Methods" R. Duda et al. Pattern Classification, Second Edition pp. 350-360; 2001.

"Geostatistics for Natural Resources Evaluation" P. Goovaerts Chapter 6; Local Estimation; Accounting for Secondary Information pp. 185-202; 1997.

Reflectance Map: Shape from Shading: B. Horn—Robot Vision pp. 243-253; 1991.

Butz, Torsten , et al., "From error probability to information theoretic (multi-modal) signal processing", *Signal Processing*, Elsevier Science Publishers B.V. Amsterdam, NL, vol. 85, No. 5, (May 2005),875-902.

Carper, W. J., et al., "The Use of Intensity-Hue-Saturation Transformations for Merging SPOT Panchromatic and Multispectral Image Data", *Photogrammertric Engineering and Remote Sensing, American Society for Photogrammetric and Remote*, vol. 56, No. 4.,(Apr. 1, 1990),459-467.

Eismann, Michael T., et al., "Application of the Stochastic Mixing Model to hyperspectral Resolution Enhancement", *IEEE Transactions on Geoscience and Remote Sensing*, IEEE Service Center, Piscatawa, NJ, vol. 42, No. 9,(Sep. 2004),1924-1933.

Geman, Stuart , et al., "Stochastic Relaxation, Gibbs Distributions, and the Bayesian restoration of Images", *IEEE Transactions on Pattern Analysis and Machine Intellegence*, IEEE Service Center, Los Alamitos, CA, US, vol. 6, No. 6.,(Nov. 1, 1984),721-741.

Thonemann, Ulrich W., "Finding Improved Simulated Annealing Schedules with Genetic Programming", *Evolutionary Computation, 1994. IEEE World Congress on Computational Intellegence*, Proceedings of the First IEEE Conference On Orlando, FL, (Jun. 27, 1994),391-395.

Vesteinsson, Ari , et al., "Spectral Consistent Satellite Image Fusion: Using a High Resolution Panchromatic and Low Resolution Multispectral Images", *Geoscience and Remote Sensing Symposium 2005*, IGARSS '05 Proceedings, 2005 IEEE International Seoul, Korea 25-29, Jul. 2005, Piscataway, NJ,(Jul. 25, 2005),2834-2837.

* cited by examiner

METHOD AND APPARATUS FOR PROPAGATING HIGH RESOLUTION DETAIL BETWEEN MULTIMODAL DATA SETS

FIELD OF THE INVENTION

The invention pertains to computer science and, particularly, digital imaging. More particularly, the invention pertains to propagating information between data sets of two different modalities.

BACKGROUND OF THE INVENTION

Often, two or more different data sets of information about an entity are available in two or more different modalities. A classic example of this occurs frequently in the field of medical imaging. For instance, an MRI (magnetic resonance imaging) scan of an anatomical feature of a patient as well as a CT (computer tomography) scan of the same feature may be available. One of these images, most likely the MRI scan in this example, may have a higher resolution than the other image. Nevertheless, the CT image may show certain features with much better clarity than the MRI image (e.g., bone), whereas the MRI image may show a different feature (e.g., soft tissue) with much better clarity than the CT image. Often, this is exactly why two images of the same object are obtained in different modalities.

The image(s) in one of the modalities may have a higher resolution that image(s) in the other modality.

Another example of a common situation in which two images (or datasets) are available describing the same entity occurs in geographic mapping. Often a relatively low resolution terrain map of a geographic area is available as well as a higher resolution aerial photograph of the same geographic area. For example, ten-meter resolution terrain elevation data and corresponding one-meter resolution orthophotos are available online for most of the United States from the USGS's Seamless Data Distribution System.

As yet another example, visible and thermal IR images of the same scene may have different effective resolutions because the sensors have different resolutions or because one camera is focused on a narrow part of the scene.

Several techniques are known for computer enhancing the resolution of a given image in a given modality in order to improve the clarity of the image. One of the simpler techniques is interpolation or extrapolation. In such a technique, typically some form of averaging of the values (e.g., intensities) of adjacent pixels is done in order to fill in (or add) pixels between those adjacent pixels. In image processing, a standard interpolation technique is bilinear interpolation. This technique uses a weighted average of the four existing pixel values to the upper left, lower left, upper right, and lower right of the location that is to be filled in. One way to think of interpolation is to fill in values by assuming smoothness.

Another technique for enhancing resolution of an image is superresolution. Usually in superresolution, multiple images of the same object in the same modality are obtained. The images might be obtained from slightly or vastly different perspectives. The images are registered with respect to each other, i.e., the translation and location parameters that properly align overlapping views of an object are determined so as to reconstruct from these partial views an integrated overall representation of the object. Then, the sub-pixel motions between the images estimated by the registration are used to construct a single image that has a higher resolution than any of the single images.

This process has been used with multiple images from the Hubble telescope to increase the telescope's effective resolution. A superresolution approach that uses multiple images of terrain to construct a three-dimensional surface with higher resolution than would be possible using only stereo vision with two images is described in P. Cheeseman, B. Kanefsky, R. Kraft, J. Stutz, and R. Hanson. Super-resolved surface reconstruction from multiple images. Technical Report FIA-94-12, NASA Ames Research Center, December 1994.

Another technique is texture synthesis. In texture synthesis, a statistical model of an image texture is created from existing images that demonstrate the texture. Then, that texture model is used in a new image to fill holes with a similar, but unique, instance of that texture. For example, if it is necessary to remove a person from a field of grass in an image, one might model the grass texture from the image and then write over the person in the image with newly synthesized "grass" that is visually consistent with the other grass in the image. See, e.g., S. Zhu, Y. Wu, and D. B. Mumford. FRAME: Filters, random field and maximum entropy: towards a unified theory for texture modeling. International Journal of Computer Vision, 27(2):1-20, March/April 1998.

Surface hole filling is another technique that can be used in connection with 3-D imaging in which holes in a 3-D surface are filled in with a surface patch that is consistent with the hole border's geometry. See, e.g., J. Davis, S. E. Marschner, M. Garr, and M. Levoy. Filling holes in complex surfaces using volumetric diffusion. In *Proceedings of the First International Symposium on* 3*D Data Processing, Visualization, and Transmission*, June 2002.

It also is known to register images from two different modalities with each other. For instance, this is known in the field of surgical navigation in which real-time infrared images of the surgical field containing a patient are obtained and registered to previously obtained images, such as CT images of the patient. This, for instance, is often used to help guide a surgical instrument in real-time towards an anatomical feature, such as a tumor.

Furthermore, a technique known as shape-from-shading is a process of recovering 3-D shape information from a single image using a known mapping from image intensities to possible object surface slopes. Shape-from-shading was originally developed by B. K. P. Horn and colleagues and is described in his textbook (B. K. P. Horn, Robot Vision, MIT Press, Cambridge, Mass., 1991). While shape-from-shading does infer a data set of one modality (depths) from a data set of a second modality, it does not exploit values of the second modality that do already exist, such as sparse values in a low-resolution image.

None of the aforementioned image processing techniques involves enhancing the resolution of an image in one modality based on a data set in another modality.

Accordingly, is an object of the present invention to provide a new and improved image processing technique.

It is another object of the present invention to provide a method and apparatus for enhancing the resolution of a data set in a first modality based on information in a data set in a second modality.

SUMMARY OF THE INVENTION

The dataset describing an entity in a first modality and of a first, high resolution is used to enhance the resolution of a dataset describing the same entity in a second modality of a lower resolution.

In accordance with the concepts of the present invention, the two data sets of different modalities are spatially registered to each other, for example, using maximization of mutual information. From this information, a joint histogram of the values in the two datasets is computed. This provides a raw analysis of how the intensities in the first dataset correspond to intensities in the second dataset. This is converted into a joint probability of possible intensities for the missing pixels in the low resolution dataset (i.e., the pixels that will be inserted between the existing pixels in order to increase the resolution) as a function of the intensities of the corresponding pixels in the high-resolution dataset. This provides a very rough estimate of the intensities of the "missing" pixels in the low resolution dataset. Then, an objective function is defined over the set of possible new values that gives preference to datasets consistent with (1) the joint probabilities, (2) the existing values in the low resolution dataset, and (3) smoothness throughout the data set. Finally, an annealing or similar iterative method is used to minimize the objective function and find an optimal solution over the entire dataset.

DETAILED DESCRIPTION OF THE INVENTION

Figure 1:
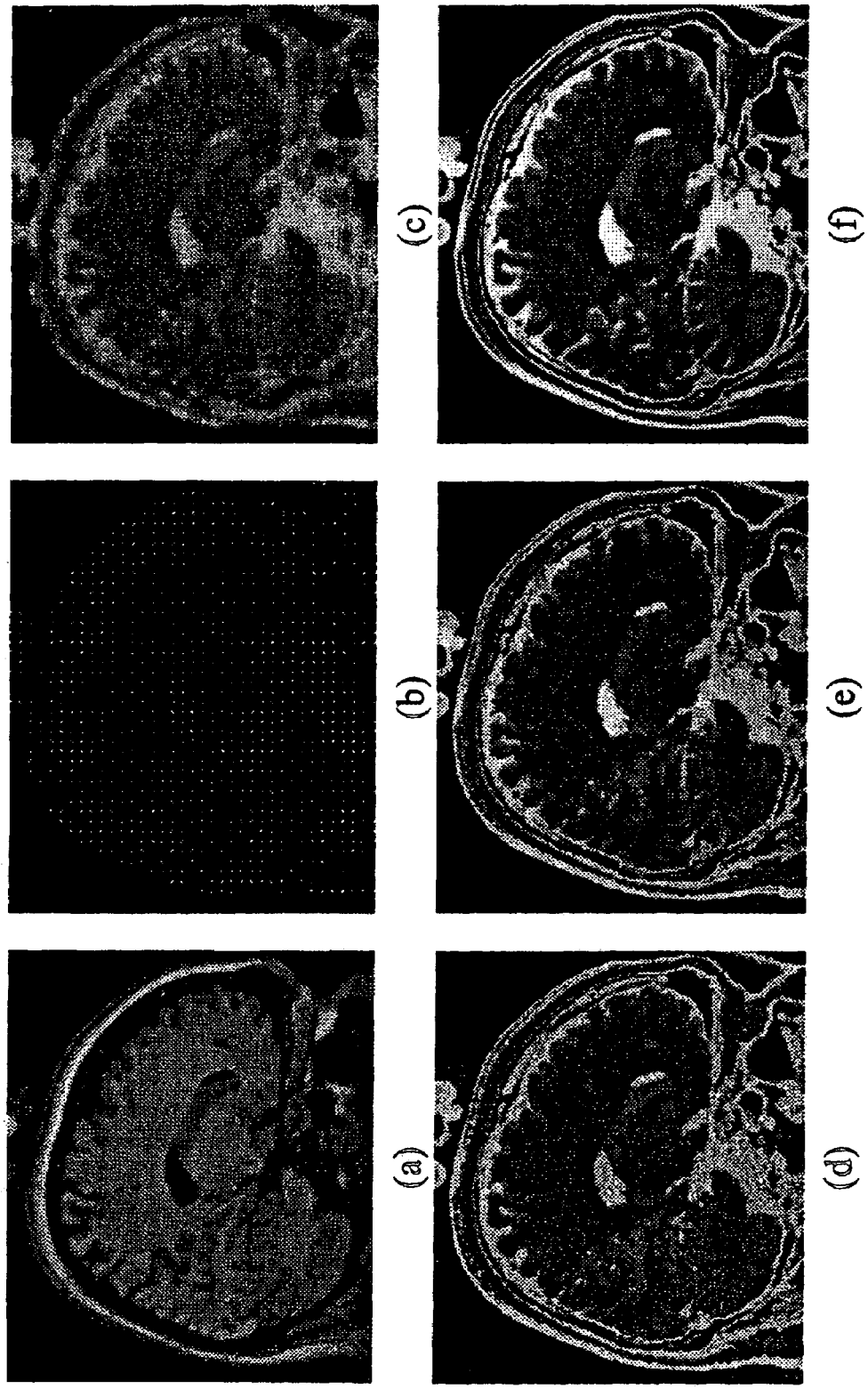
FIGS. 1A-1F are diagrams illustrating the propagation of detail from a data set of one modality to a data set of another modality using the principles of the present invention.
Figure 2:
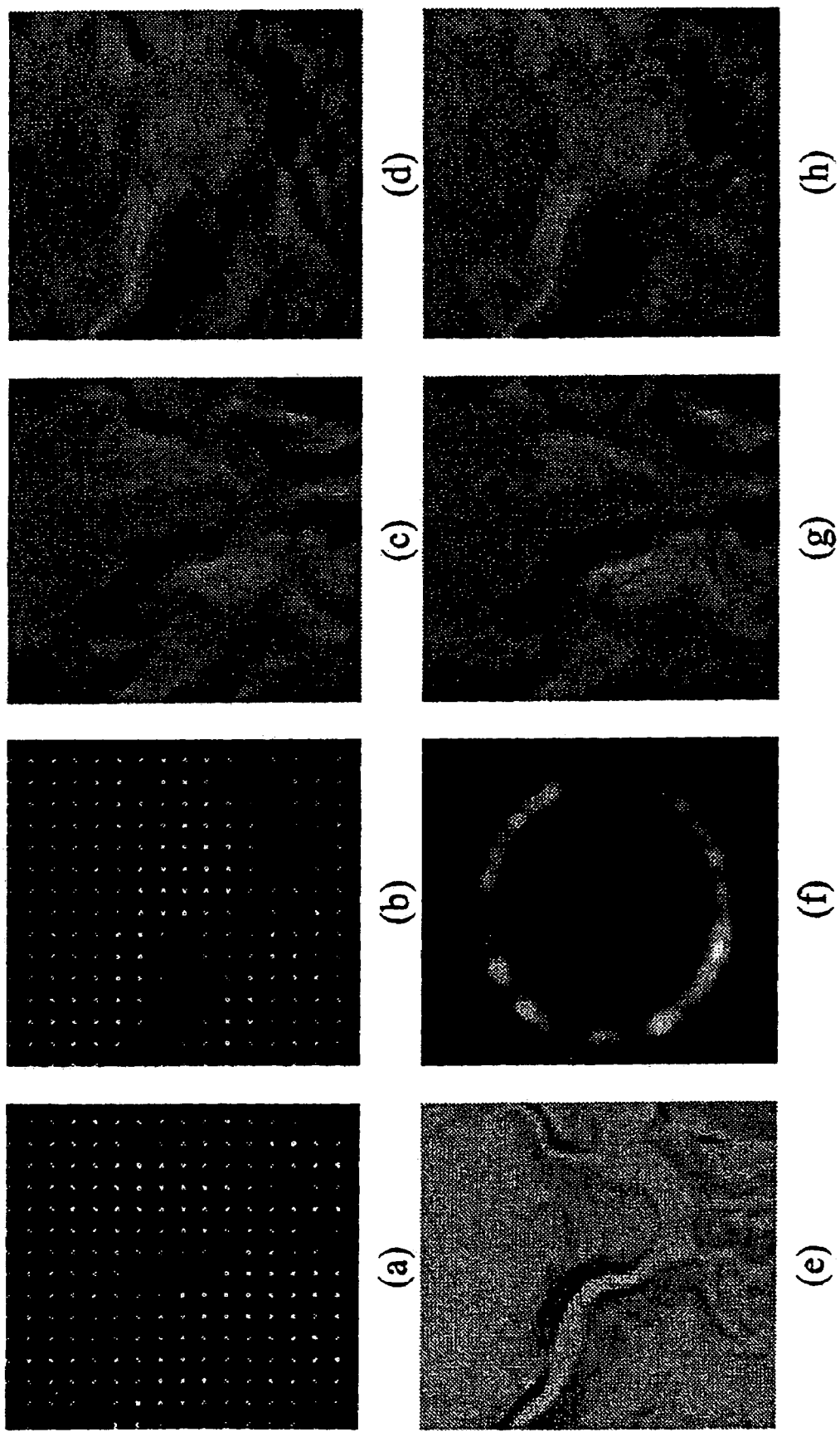
FIGS. 2A-2H are a series of diagrams illustrating the recovery of terrain normals from a terrain image and subsampled normals using the principles of the present invention.

The invention concerns a method and apparatus for propagating higher-resolution detail from a dataset of one modality to a spatially registered, lower-resolution (subsampled) dataset of a second modality. A Gibbs joint posterior distribution for the missing values in the low-resolution dataset is defined, incorporating (1) an MRF (Markov Random Fields) smoothness prior and (2) likelihoods for the observed high-resolution values derived from empirical joint statistics relating the two modalities. This posterior is maximized using Gibbs sampling, producing a maximum a posteriori (MAP) estimate for the missing values.

The goal of the present invention is to improve the resolution or coverage of an existing dataset of a first modality using a more complete (e.g., higher resolution) dataset of a second modality. The technique exploits both the data that exists in the lower-quality dataset and the statistical information provided by the values in the higher-quality dataset.

Our algorithm estimates missing values in a lower-resolution dataset, given a spatially registered, higher-resolution dataset of a different modality. FIGS. 1A-1F illustrate this process. In this example, a full-resolution T MRI dataset shown in FIG. 1A and a low-resolution (sampled) T2 dataset shown in FIG. 1B are supplied. Using a smoothness prior and likelihoods for the observed T1 values given the missing T2 values, maximum a posteriori (MAP) estimates for missing values are found using Gibbs sampling. Three different estimates generated by the algorithm assuming different kinds and levels of smoothness are shown in FIGS. 1C, 1D, and 1E. The ground truth, full-resolution T2 image is shown in FIG. 1F.

Datasets

In this specification, the terms "dataset" and "image" are used interchangeably, although the datasets are not always optical intensity images. In addition, the following definitions will apply.

The image f is the enhanced resolution image of modality 1 that is to be generated. It is generated by observing an object or scene with modality 1. The size of f is r rows by c columns, and its pixels take on discrete values. Most of f is unknown, but we observe part of f as the degraded image f' described below.

The image g is the existing higher resolution image in modality 2. It is generated by observing the same object or scene with modality 2. Like f, g has r rows and c columns and takes on discrete values. Image g is known and spatially registered with f.

A subsampled image f' is the existing lower resolution image in modality 1 that will be resolution enhanced in accordance with the principles of the present invention. It gives values of f at a few points. In this example, the samples are at every fifth grid point, (1, 1), (1, 6), ... (6, 1), (6, 6), ..., so that we have approximately 4% of the information of f in f'. f' has size r×c but is only defined as the known sample points.

$s_1, \ldots, s_{r \times c}$ specify the two-dimensional (row, column) pixel locations, or "sites" or "datapoints", in these images. These subsets $s_{d1}, s_{d2}, \ldots$ and $s_{u1}, s_{u2}, \ldots$ give the sites where f' is defined and undefined, respectively.

Gibbs Distribution and MRFs

In subsequent sections, we will perform maximum a posteriori (MAP) estimation of the unknown values of f, by finding the mode of a posterior distribution incorporating both a smoothness prior for f and our observations g. The posterior and prior distributions will both be Gibbs distributions, or equivalently, Markov random fields (MRFs). We present a brief summary of Gibbs distributions and MRFs that closely follows that in S. Geman and D. Geman. Stochastic relaxation, Gibbs distributions, and the Bayesian restoration of images. *IEEE Transactions on Pattern Analysis and Machine Intelligence*, PAMI-6(6):721-741, November 1984, incorporated herein by reference, but is specialized to the present problem.

The Gibbs distributions have the form $$\pi(f) = \frac{1}{Z} e^{-U(f)/T} \quad (1)$$

where Z is a normalizing constant that brings the volume under π to 1, $$Z = \sum_f e^{-U(f)/T} \quad (2)$$

and the "temperature" T is a constant with respect to f; T's effect is explained in the subsection entitled Gibbs sampling below. The energy function U has the form $$U(f) = \sum_{C \in \chi} V_C(f) \quad (3)$$

where, for our problem, X is a set of sets C including:

singleton sets $C=\{s_{u_i}\}$ representing a single site where the value of f is unknown, and pair sets $C=\{s_i, s_j\}$, each representing a pair of eight-neighboring sites $V_C(f)$ assigns an energy to a singleton set $C=\{s_{u_i}\}$ or pair set $C=\{s_i, s_j\}$ based on the assignments in f. The $V_C(f)$ for our prior and posterior are described in the subsections below.

The local characteristics of the distribution are the conditional distributions for the value $f(S_i)$ at a single site given the values at all other sites. For the distribution (1), the local characteristics are:

$$P(f(s_i) | f(s_j), u_i \neq j) = Z_{s_i}^{-1} \exp\left\{-\frac{1}{T} \sum_{C: s_i \in C} V_C(f)\right\} \quad (4)$$

where $Z_{s_i}$ is again a normalizing constant that brings the volume under the distribution to one. Taken together, the local characteristics constitute the MRF equivalent to the original Gibbs distribution.

Prior Distribution

To derive a smoothness prior on f, we assign a joint distribution to pairs of values at eight-neighbors based on the approximate spatial derivatives of f. Specifically, if $s_i$ and $s_j$ are eight-neighbors, then $$\Delta_{i,j} = \frac{f(s_j) - f(s_i)}{\|s_j - s_i\|} \quad (5)$$

$$P_{i,j}(f) = N_{0,\sigma_s}(\Delta_{i,j}) = \frac{1}{2\pi\sigma_s^2} \exp\left\{\frac{-\Delta_{i,j}^2}{2\sigma_s^2}\right\} \quad (6)$$

where $N_{0,\sigma_s}$, is the normal distribution with zero mean and standard deviation $\sigma_s$. We assume that the $P_{i,j}$ for each pair of neighboring sites are independent, including pairs that include a common site. So, $$P(f) = \prod_{\{s_i, s_j\} \in \chi} P_{i,j}(f) \quad (7)$$

If we write $$V_{\{s_i,s_j\}}^{prior}(f) = -\log\left(\frac{1}{2\pi\sigma_s^2}\right) + \frac{\Delta_{i,j}^2}{2\sigma_s^2} \quad (8)$$

$$U_{prior}(f) = \sum_{\{s_i,s_j\} \in \chi} V_{\{s_i,s_j\}}^{prior}(f) \quad (9)$$

then substituting (9) for U(f) in (1), (2) with T=1 produces (7). That is, the prior distribution (7) is a Gibbs distribution with the energy function given by (9).

This smoothness prior has one parameter, $\sigma_s$, which will be called the spatial smoothness parameter hereinafter.

This smoothness prior is a relatively blunt instrument, favoring values $f(s_{u_i})$ close to $f(s_j)$ for nearby $s_{u_i}$, $s_j$, without regard for the corresponding values of g. A second smoothness assumption, which will be called weak smoothness hereinafter, is that $f(s_{u_i})$ is close to $f(s_j)$ if $s_{u_i}$ is near $s_j$ and $g(s_{u_i})$ is similar to $g(s_j)$. Weak smoothness can be deployed in those situations where the output dataset is not expected to exhibit much pixel-to-pixel spatial smoothness. In the next subsection, a weak smoothness assumption is introduced into the estimates via the observation likelihood function.

Likelihoods

To derive a likelihood P(g|f) for the observations g, let us assume that the likelihoods of the individual g values given the corresponding f values are independent, so that:

$$P(g | f) = \prod_{s_{u_i}} P(g(s_{u_i}) | f(s_{u_i})) \quad (10)$$

If we then write $$V_{\{s_{u_i}\}}^{like}(f) = -\log P(g(s_{u_i}) | f(s_{u_i})) \quad (11)$$

$$U_{like}(f) = \sum_{\{s_{u_i}\} \in \chi} V_{\{s_{u_i}\}}^{like}(f) \quad (12)$$

then substituting (12) for U(f) in (1), (2) produces (10). This relationship will be used below in showing that our posterior distribution is a Gibbs distribution.

The likelihood functions $P(g(s_{u_i})|f(s_{u_i}))$ for the individual sites $s_{u_i}$ are constructed by extracting them from joint distributions $P(g(s_{u_i}),f(s_{u_i}))$. Two ways of choosing the joint probability distributions are explored.

One possible way is to use a single global joint distribution at every site $s_{u_i}$. This global distribution might be generated empirically by taking the joint histogram of known values in f and the corresponding values in g, or by taking the joint histogram of corresponding values in a larger ensemble of registered modality 1 and modality 2 example images. Alternately, the global distribution might be found analytically using a known model of the modality 1 and modality 2 observation processes. For instance, the intensity values of certain tissue types in MRIs and CT scans, respectively, may be well known such that it is not necessary to generate a histogram based on the actual images in question.

A second way is to use a different joint distribution for every site $s_{u_i}$. For example, the joint distribution for $s_{u_i}$ can be chosen by augmenting the global distribution with an additional probability mass around the known values of f near $s_{u_i}$ and the corresponding values of g. This is a type of weak smoothness, as described in the previous subsection.

In experiments, a global joint distribution was generated empirically, and then generated a local joint distribution for each $s_{u_i}$ by adding Gaussian-shaped masses to the joint distribution near the values of the known samples in f near $s_{u_i}$ and the corresponding values in g. These masses are specified by a shape covariance matrix $C_W$ and weight $m_w$.

Posterior Distribution

Using Bayes' theorem, the posterior distribution P(f|g) that we will maximize can be written as $$P(f | g) = \frac{P(g | f) P(f)}{P(g)} \quad (13)$$

where P(g|f) and P(f) are the likelihood (10) and prior (7), respectively. Combining the energies $U_{prior}$ and $U_{like}$ for the prior and likelihood distributions, we have:

$$U_{post} = U_{prior} + U_{like} \quad (14)$$

which substituted into (1), (2) produces the distribution (1). That is, the posterior is a Gibbs distribution with energy $U_{post}$. So, the joint posterior can be maximized using Gibbs sampling as described below.

Gibbs Sampling

Geman and Geman describe a stochastic relaxation algorithm called the Gibbs Sampler for finding the modes of a Gibbs distribution. The Gibbs Sampler's operation when applied to the posterior distribution in accordance with the present invention is as follows.

On each iteration k, the estimate is updated for each unknown pixel value $f(s_{u_i})$, sequentially and in raster scan order. (That is, each iteration k includes a full raster scan). The new estimate for $f(s_{u_i})$ is found by randomly sampling from the local characteristics (4) of the posterior for site $s_{u_i}$. This operation is the same as the Gibbs Sampler operation described by Geman and Geman for image restoration, except that they perform an update at every site (i.e., pixel location) $s_i$, whereas, in accordance with the present invention, updates are performed only at the sites $s_{u_i}$ where the value of f is unknown.

On each iteration k, the Gibbs distribution temperature T is reduced according to a preset annealing schedule. During early iterations, the high temperature (T>1.0) flattens the distribution, reducing the prominence of the modes. Sampling from this high temperature distribution encourages site updates that lower the probability of the joint estimate f (as measured by the distribution for T=1.0) and allows the algorithm to explore widely separated parts of the solution space. During later iterations, after the temperature has been gradually reduced to below T=1.0, the lower temperatures increase the prominence of the modes that have been discovered. Sampling from these lower temperature distributions increasingly focuses the search in the high probability regions of the T=1.0 distribution.

Geman and Geman prove that for a sufficiently slow annealing schedule that they describe, this procedure "forces the system into the lowest energy states," but also point out that this schedule is too slow to be used in practice. Instead, the authors suggested adopting a faster annealing schedule with the same parametric form. In particular, $$T(k) = \frac{C}{\log(1 + k)} \quad (15)$$

where T(k) is the temperature during all of iteration (i.e., raster scan) k. The authors used C=3 and C=4 in their experiments.

For the present application, a similar form for the annealing schedule may be used that can be easily fit to a specified number of iterations $k_{final}$, initial temperature $T_{initial}$, and final temperature $T_{final}$:

$$T(k) = \frac{C}{\log(1 + \varepsilon + \delta(k - 1))} \quad (16)$$

Choosing:

$$\varepsilon = 10^{-6} \quad (17)$$

$$C = T_{initial}\log(1 + \varepsilon) \quad (18)$$

$$\delta = \frac{e^{C/T_{final}} - (1.0 + \varepsilon)}{k_{final} - 1} \quad (19)$$

fits (16) to $T(1)=T_{initial}$, $T(k_{final})=T_{final}$ and produces an appropriate (e.g., smooth) temperature curve for a wide range of $k_{final}$, $T_{initial}$, and $T_{final}$.

In experiments, the initial temperature has been chosen high enough that the sample image resulting from the first raster scan is a random, salt-and-pepper image. Typically, as $\sigma_s$ decreases, $T_{initial}$ must increase to achieve this.

Estimating Coupled Datasets

The previous subsections describe a Gibbs sampler for inferring missing values in a low-resolution, subsampled dataset f with the help of a spatially registered, high-resolution dataset g of a different modality. FIG. 1 shows an example of such an f, g pair, and the performance of the above-described algorithm on this dataset pair is described in the Medical Images section below.

In an alternate embodiment, the algorithm may be generalized slightly to simultaneously estimate missing values in two coupled datasets $f_1$, $f_2$, with the help of a third dataset g of a different modality. In the section below entitled Terrain, this generalized algorithm's performance in simultaneously estimating x and y components of terrain surface normals from a simple image of the terrain is investigated. In this example, the output x and y surface normals at each point should not be estimated independently, but should be consistent with each other as well as the observed image intensity at that point.

The generalized algorithm for estimating coupled datasets is a natural extension of the base algorithm. The necessary extensions are:

1. The joint probability function used to compute the observation likelihood is now three-dimensional, describing the co-occurrence statistics of $f_1$, $f_2$, and g. Similarly, the weak smoothness mass is three-dimensional.
2. During each raster scan of the simulated annealing process, values of both $f_1$, and $f_2$ at each of the missing data sites $s_{u_i}$ are generated by sampling their respective local characteristics. As an ordering, let us choose to generate a sample value for $f_2$ at $s_{u_i}$ immediately after generating the corresponding sample for $f_1(s_{u_i})$. However, because the likelihood for $g(s_{u_i})$ depends on both $f_1(s_{u_i})$ and $f_2(s_{u_i})$, the local characteristics for $f_2(s_{u_i})$ that we sample from depend on the current sample for $f_1(s_{u_i})$, and vice-versa.

Results

Medical Images

This subsection summarizes the algorithm's performance in estimating full-resolution T2 MRI images from subsampled T2 and full-resolution T1 images. These experiments use simulated datasets from the McConnell Brain Imaging Centre's online database. These datasets are generated using realistic models of the brain and MRI imaging process, are available with a range of systematic error and random noise levels, and are spatially registered.

The datasets selected for the experiments have size 181× 217×181 voxels, with individual voxels having size 1 mm³ and taking on greyscale values in the range [0, 255]. In each of the experiments described below, saggital image 108 was arbitrarily selected for processing from the 181 saggital images available. As described below, the datasets selected include different levels of random, pixelwise intensity noise and different levels of intensity non-uniformity (INU), which is a spatially varying error in the intensities.

As described above, the algorithm's behavior is determined by several parameters, including the spatial smoothness parameter $\sigma_s$, the weak smoothness mass shape $C_w$ and weight $m_w$, the choice of joint probability function, the initial annealing temperature $T_{initial}$, final annealing temperature $T_{final}$, and number of annealing iterations $k_{final}$. Together, the dataset and algorithm parameters describe a large space of possible scenarios. Below, two sets of experiments that each explore a part of this space are summarize.

In the first set of experiments, the algorithm's performance is investigated as a function of (1) the INU and random noise levels, and (2) the adopted joint probability function. The INU and random noise levels for the four datasets considered are shown in Table 7. In brief, the four datasets cover all four combinations of {INU, no INU} and {random noise, no random noise}, with the noise and INU levels chosen to be the McConnell database defaults. The joint probability functions considered are each generated by applying the Parzen window technique to one of the following joint histograms:

1. An "ideal image" joint histogram, generated from the given T1 full-resolution image and the ground truth, full-resolution T2 image. Of course, the ground truth T2 image would not be available in a normal application of the algorithm.
2. A "subsampled image" joint histogram, generated from the given full-resolution T1 image and the given subsampled T2 image. Both of these images would be available in a normal application of the algorithm.
3. A "subsampled volume" joint histogram, generated from the given full-resolution T1 volume and the given subsampled T2 volume. Both of these volumes would be available in a normal application of the algorithm to images extracted from medical volumes.

In each experiment, the spatial smoothness parameter $\sigma_s$ is chosen to be the actual standard deviation $\sigma_s$ of the approximate spatial derivatives in the ground truth, full-resolution T2 image. The weak smoothness mass has weight $m_w$=50 in each experiment, and a shape $C_w$ chosen based on the random noise levels in the T1 and T2 images; these values are summarized in Table 1. In each experiment in this set, an annealing schedule with $T_{initial}$=15, $T_{final}$=0.075, and $k_{final}$=250 was used.

Table 2 gives the average absolute difference in greylevel for the pixels in the estimated, full-resolution T2 image and ground truth T2 image. In this experiment, it appears that (1) random image noise has a larger adverse effect on the algorithm's accuracy than spatially varying errors, and (2) the subsampled image probability function, which is the probability function expected in practice, provides almost the same accuracy as an ideal probability function generated using the full (and usually unknown) T2 image.

In the second suite of experiments, the effects of the spatial smoothness parameter $\sigma_s$ and the weight $m_w$ of the weak smoothness mass are considered. Specifically, we consider $\sigma_s \in \{\sigma_s/4, \sigma_s/2, \sigma_s, 2\sigma_s, 4\sigma_s\}$, and $m_w \in \{0, 25, 50\}$. In each case we have used dataset 4, which includes both random noise and INU, as described in Table 1. Accordingly, the same weak smoothness mass shape $C_w$ was used as that described for dataset 4 in the first set of experiments.

As described in the section above entitled Gibbs Sampling, the initial annealing temperature $T_{initial}$ required to produce a random, salt and pepper initial estimate for the annealing differs depending on the level of smoothness assumed in the MRF prior. More smoothness requires a higher starting temperature. So, the annealing schedule is manually adjusted for different choices of $\sigma_s$. For $\sigma_s = \sigma_s/4$, $T_{initial}$=120.0, $T_{final}$=0.6; for $\sigma_s = \sigma_s/2$, $T_{initial}$=45.0, $T_{final}$=0.225; and for $\sigma_s \geq \sigma_s$, $T_{initial}$=15.0, $T_{final}$=0.075 are used. In each case, $k_{final}$=250 iterations.

The resulting errors are summarized in Table 3. While the errors in Table 3 might suggest a relatively small change in the accuracy as $\sigma_s$ and $m_w$ vary, the visual differences between these results are significant. In particular, choosing $\sigma_s$ far smaller than the ideal value $\sigma_s$ results in images that do not reflect the fine detail in the ground truth image, and tuning $m_w$ can sometimes remove qualitative errors in the output image.

One would not expect or want the algorithm to estimate random noise in the full-resolution output images. So, for each experiment, $\sigma_s$ and the average absolute errors are computed using a ground truth image without random noise.

Terrain

This subsection describes initial experiments in estimating full-resolution x and y components of terrain surface normals from a simple, full-resolution image of the surface and subsampled normals. Using the algorithm for coupled datasets described above, once the full-resolution x and y components of a surface have been recovered, each full normal vector can be reconstructed by appending the z component value that brings the total vector magnitude to 1.0. A full-resolution terrain elevation map could then be estimated by integrating these reconstructed normals.

An elevation dataset representing a small patch of New Mexico was taken from the ⅓ arc second (10 meter) resolution USGS National Elevation Dataset (NED), available online via the USGS's Seamless Data Distribution. These elevation values were numerically differentiated to generate ground truth $n(s_i)=[n_x(s_i)\ n_y(s_i)\ n_z(s_i)]^T$ unit surface normals for each site $s_i$, and an image $I(s_i)$ of the surface was generated from these normals using $I(s_i)=n(s_i)\cdot l$, where l is the unit lighting direction. In rendering terms, this simple image ignores shadowing, and assumes Lambertian reflection, constant surface albedo, and a distant light source. The resulting $n_x$, $n_y$, and I were then independently linearly transformed with transformations $t_x$, $t_y$, and $t_I$ to fill the range [0, 149] and discretized. As with the medical images described in subsection 4.1 above, subsampled normal images $n_x$, and $n_y$ were generated by selecting every fifth pixel from $n_x$ and $n_y$, as described in subsection 3.2. So, the subsampled normal images contain about 4% of the full-resolution normal data.

The full-resolution normal images $n_x$ and $n_y$ were estimated by applying the method for coupled datasets, described above to I, $n_x$, and $n_y$. For this experiment, the lighting direction is [0 0 1], so that the image I reduces to a map of the surface normal z components. The spatial smoothness parameter was chosen to be $\sigma_s$=21.56, which is the average of actual smoothness values $\sigma_s$ calculated from x and y ground truth normal images. After some experimentation, the shape $C_w$ and weight $m_w$ of the weak smoothness mass was chosen to be $40^2 \cdot I_3$ and 200, and the annealing start temperature, final temperature, and number of iterations to be $T_{initial}$=30.0, $T_{final}$=0.2, and $k_{final}$=250.

For use in computing the likelihoods, a joint probability function was computed by applying the Parzen window technique to an ideal histogram computed using the ground truth x normal image $n_x$, y normal image $n_y$, and terrain image I. This histogram is similar to the "ideal image" histogram described for MRI images above in the subsection entitled Medical Images, but has three dimensions rather than two.

The input images and resulting outputs are shown graphically in FIGS. 2A-2H. The average absolute errors in estimated x and y normal components, computed from the [0, 149] greyscale values, are 5.68 and 6.93, respectively. When these values are mapped back to unit normal vectors via $t_x^{-1}$ and $t_y^{-1}$, the average absolute error in angle between the estimated normal vector and the ground truth normal vectors is 6.17 degrees.

This specification has described a Gibbs sampler for estimating high-resolution datasets from a lower-resolution (sub-sampled) dataset of a first modality and a spatially registered, higher-resolution dataset of a second modality. Initial experiments indicate that while the resulting estimated datasets are not exact, they do correctly capture most of the high-resolution detail in the corresponding ground truth data.

Flowchart

Figure 3:
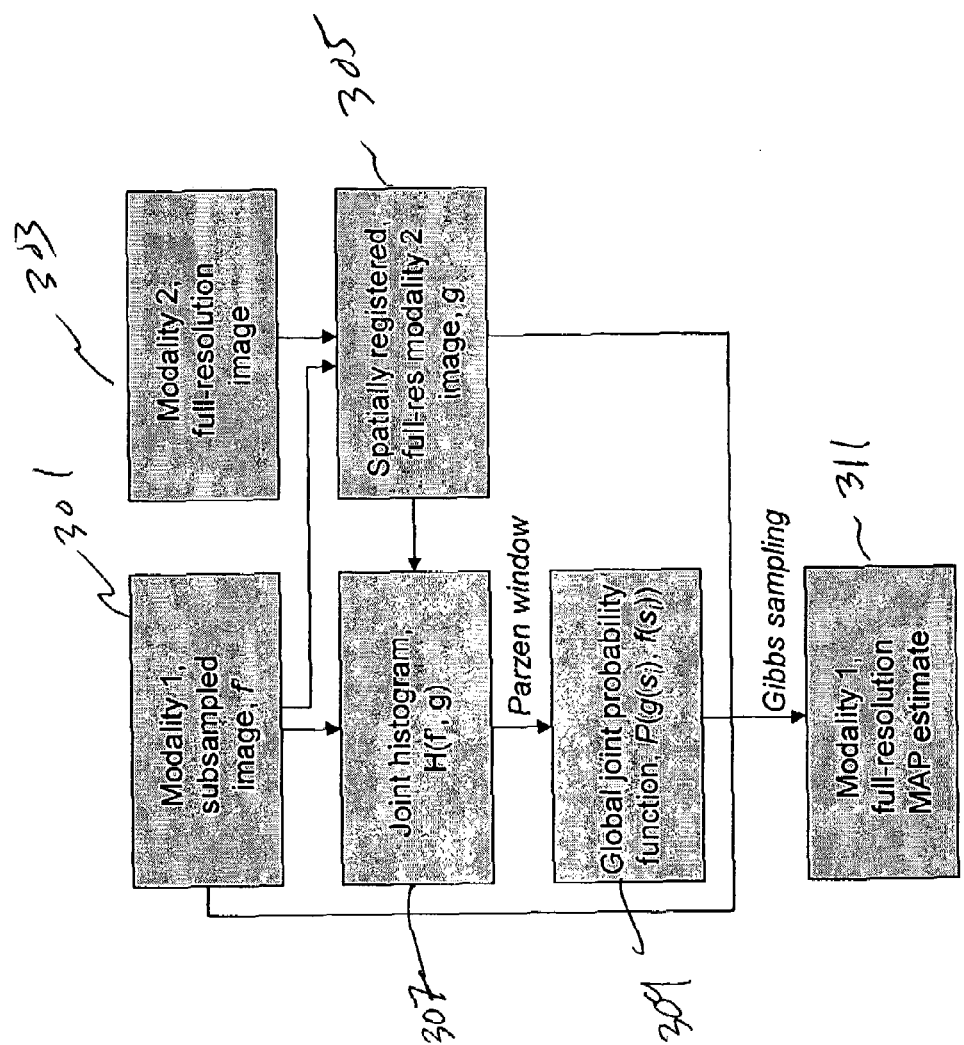
FIG. 3 is a flow diagram illustrating the basic steps of a process in accordance with one particular embodiment of the present invention.

Having thus described the principles of the present invention, FIG. 3 illustrates basic steps in accordance with one particular embodiment. A lower resolution image of a first modality 301 and a higher resolution image of a second modality 302 comprise the basic input datasets. In step 305, the two images are spatially registered with each other.

Registration can be obtained by using a registration-by-mutual-information technique. Registration-by-mutual-information techniques are known for datasets of the same resolution. Such techniques can be adapted to accommodate datasets of different resolutions. Furthermore, a registration technique might be used in which registration is performed iteratively and/or simultaneously with the filling in of the missing pixels. Alternately, a simple initial estimate for the registration in such an iterative and/or simultaneous process could be found by interpolating between existing values in the low-resolution datasets using bilinear interpolation, and then performing a mutual information registration between the high-resolution dataset and the interpolated dataset.

Next, in step 307, a joint histogram is generated.

In step 309, the global joint probability is developed using, for example, a Parzen window technique.

Finally, in step 311, an enhanced resolution image of the first modality is generated by iteratively maximizing the posterior distribution function P(f|g).

The invention has been described hereinabove with respect to certain examples in which the datasets are images, e.g., photographs, CT scans, MRIs. However, the concepts of the present invention should be generally applicable to any two or more datasets of different modalities describing the same entity.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A method for enhancing the resolution of a first dataset describing an entity in a first modality and having a first resolution, said enhancement being based on a second dataset describing said entity in a second modality having a second resolution higher than said first resolution, said method comprising the steps of:

(1) spatially registering said first and second datasets to each other;

(2) generating a joint probability describing the probability of an intensity value for each of a set of missing datapoints in the first dataset using an intensity value of a corresponding datapoint in the second dataset to provide an estimate of the intensities of the missing datapoints in the first dataset; and (3) iteratively maximizing a function over the set of probabilities of intensity values of said missing datapoints to generate a third dataset of said first modality having a higher resolution than said first dataset, said function giving preference to a dataset consistent with (i) said joint probability and (ii) a smoothness assumption.

2. The method of claim 1 wherein step (2) comprises:

(2)(a) generating a joint histogram of the values in the first and second datasets; and (2)(b) converting said joint histogram into said joint probability.

3. The method of claim 1 wherein said iterative maximization of step (3) comprises an annealing process.

4. The method of claim 3 wherein iterative maximization of step (3) comprises a Gibbs sampling process.

5. The method of claim 4 wherein said Gibbs sampling process uses the function;

$$T(k) = \frac{C}{\log(1 + \varepsilon + \delta(k-1))}$$

wherein:

T=temperature;

$\varepsilon$=a very small number;

$$C = T_{initial}\log(1+\varepsilon);$$

$$\delta = \frac{e^{c/T_{final}} - (1.0 + \varepsilon)}{k_{final} - 1};$$

k=an iteration index;

$k_{Final}$=an index of the last iteration;

$T_{Initial}$=an initial temperature for the iterations; and $T_{Final}1$=a final temperature for the iterations.

6. The method of claim 5 wherein $k_{Final}$, $T_{Initial, and\ TFinal}1$ are user selected.

7. The method of claim 1 wherein step (3) comprises giving preference to a dataset consistent with (i) the joint probability, (ii) intensity values of datapoints in the first dataset, and (iii) a smoothness assumption.

8. The method of claim 1 wherein step (3) comprises the steps of:

(a) providing a smoothness assumption for said first dataset;

(b) providing an observation likelihood for said second dataset; and (c) combining said smoothness assumption and said observation likelihood to generate a posterior distribution function, said posterior distribution function being said function.

9. The method of claim 8 wherein step (3)(a) comprises using Bayes Theorem.

10. The method of claim 1 wherein said function is:

$$P(f|g) = \frac{P(g|f)P(f)}{P(g)}$$

wherein

P=a smoothness assumption;

g=said second dataset; and f=said third dataset.

11. The method of claim 8 wherein said smoothness assumption is:

$$P(f) = \prod_{\{s_i, s_j\} \in \chi} P_{i,j}(f)$$

wherein
i=an index of a first datapoint;
j=an index of a second datapoint;
s=a datapoint;
P=said smoothness assumption;
f=said third dataset;

$$= \frac{1}{2\pi\sigma_s^2} \exp\left\{\frac{-\Delta_{i,j}^2}{2\sigma_s^2}\right\}$$

$N_{o,\sigma s}$=a normal distribution with zero mean and standard deviation $\sigma_s$
$\Delta_{i,j}$=a discrete approximation of the image value derivation between datapoints i and j $$\Delta_{i,j} = \frac{f(s_j) - f(s_i)}{\|s_j - s_i\|}; \text{ and}$$

$\chi$=a set of pairs of adjacent datapoints.

12. The method of claim 11 wherein said datasets are image datasets and i and j are two dimensional indexes.

13. The method of claim 1 wherein said datasets are image datasets.

14. The method of claim 2 wherein step (2)(b) comprises generating a plurality of singleton probability distribution functions describing how intensity values in said first dataset corresponds to intensity values in said second dataset for spatially corresponding datapoints.

15. The method of claim 2 wherein step (2)(b) comprises applying a Parzen window technique.

16. The method of claim 2 wherein step (2)(a) comprises generating a single global joint distribution for every datapoint in said first dataset.

17. The method of claim 16 wherein step (2)(a) comprises generating a joint histogram based on every datapoint in said first dataset and the spatially corresponding datapoint in said second dataset.

18. The method of claim 2 wherein step (2)(a) comprises applying a previously known model histogram for datasets of said first and second modalities.

19. The method of claim 2 wherein step (2)(a) comprises generating a different joint distribution for every datapoint in said first dataset.

20. The method of claim 19 wherein step (2)(a) comprises:
generating a joint distribution for each datapoint in said first dataset.

21. A computer-readable medium encoded with a computer readable program code for enhancing the resolution of a first dataset describing an entity in a first modality and having a first resolution, said enhancement being based on a second dataset describing said entity in a second modality having a second resolution higher than said first resolution, said medium comprising:
first computer readable program code for spatially registering said first and second datasets to each other;
second computer readable program code for generating a joint probability describing the probability of an intensity value for each of a set of missing datapoints in the first dataset using an intensity value of a corresponding datapoint in the second dataset; and
third computer readable program code for iteratively maximizing a function over the set of probabilities of intensity values of said missing datapoints to generate a third dataset of said first modality having a higher resolution than said first dataset, said function giving preference to a dataset consistent with (1) the joint probability, (2) intensity values of datapoints in the first dataset, and (3) a smoothness assumption.

22. The computer-readable medium of claim 21 wherein said second computer readable program code comprises code for generating a joint histogram of the values in the first and second datasets and converting said joint histogram into said joint probability.

23. The computer-readable medium of claim 21 wherein said third computer readable program code comprises code for performing an annealing process.

24. The computer-readable medium of claim 23 wherein said third computer readable program code comprises code for performing a Gibbs sampling process.

25. The computer-readable medium of claim 24 wherein said Gibbs sampling process uses the function:

$$T(k) = \frac{C}{\log(1 + \varepsilon + \delta(k-1))}$$

wherein
T=temperature;
$\varepsilon$=a very small number;

$$C = T_{initial} \log(1 + \varepsilon);$$

$$\delta = \frac{e^{C/T_{final}} - (1.0 + \varepsilon)}{k_{final} - 1}$$

k=an iteration index;
$k_{Final}$=an index of the last iteration;
$T_{initial}$=an initial temperature for the iterations; and
$T_{Final}$=a final temperature for the iterations.

26. The computer-readable medium of claim 25 wherein $k_{Final}$, $T_{initial}$, and $T_{Final}$ are user selected.

27. The computer-readable medium of claim 21 wherein said third computer readable program code comprises computer readable code that gives preference to a dataset consistent with (i) the joint probability, (ii) intensity values of datapoints in the low resolution dataset, and (iii) a smoothness assumption.

28. The computer-readable medium of claim 21 wherein said third computer readable program code comprises computer readable code for:
(a) providing a smoothness assumption for said first dataset;
(b) providing an observation likelihood for said second dataset; and
(c) combining said smoothness assumption and said observation likelihood to generate a posterior distribution function, said posterior distribution function being said function.

29. The computer-readable medium of claim 28 wherein said computer readable code for combining uses Bayes Theorem.

30. The computer-readable medium of claim 21 wherein said function is:

$$P(f \mid g) = \frac{P(g \mid f) P(f)}{P(g)}$$

wherein
P=a smoothness assumption;
g=said second dataset; and
f=said third dataset.

31. The computer-readable medium of claim 28 wherein said smoothness assumption is:

$$P(f) = \prod_{\{s_i, s_j\} \in \chi} P_{i,j}(f)$$

wherein
i=an index of a first datapoint;
j=an index of a second datapoint;
s=a datapoint;
P=said smoothness assumption;
f=said third dataset;

$$= \frac{1}{2\pi\sigma_s^2} \exp\left\{\frac{-\Delta_{i,j}^2}{2\sigma_s^2}\right\}$$

$N_{o,\sigma s}$=a normal distribution with zero mean and standard deviation $\sigma_s$;
$\Delta_{i,j}$=a discrete approximation of the image value derivation between datapoints i and j $$\Delta_{i,j} = \frac{f(s_j) - f(s_i)}{\|s_j - s_i\|}; \text{ and}$$

x=a set of pairs of adjacent datapoints.

32. The computer-readable medium of claim 31 wherein said datasets are image datasets and i and j are two dimensional indexes.

33. The computer-readable medium of claim 21 wherein said datasets are image datasets.

34. The computer-readable medium of claim 22 wherein said second computer readable program code for converting said joint histogram comprises computer readable code for generating a plurality of singleton probability distribution functions describing how intensity values in said first dataset correspond to intensity values in said second dataset for spatially corresponding datapoints.

35. The computer-readable medium of claim 22 wherein said second computer readable program code for converting said joint histogram comprises applying a Parzen window technique.

36. The computer-readable medium of claim 22 wherein said second computer readable program code for generating said joint histogram comprises computer readable code for generating a single global joint distribution for every datapoint in said first dataset.

37. The computer-readable medium of claim 36 wherein said second computer readable program code for generating said joint histogram comprises computer readable code for generating a joint histogram based on every datapoint in said first dataset and the spatially corresponding datapoint in said second dataset.

38. The computer-readable medium of claim 22 wherein said second computer readable program code for generating said joint histogram comprises computer readable code for applying a previously known model histogram for datasets of said first and second modalities.

39. The computer-readable medium of claim 22 wherein said second computer readable program code for generating said joint histogram comprises computer readable code for generating a different joint distribution for every datapoint in said first dataset.

40. The computer-readable medium of claim 39 wherein said second computer readable program code for generating said joint histogram comprises computer readable code for generating a joint distribution for each datapoint in said first dataset.

* * * * *